United States Patent
Home

Patent Number: 5,318,322
Date of Patent: Jun. 7, 1994

[54] CART FOR BARBECUE GRILL

[76] Inventor: William Home, 9-3 Fl., No. 374, Sec. 2, Pa Teh Rd., Taipei, Taiwan

[21] Appl. No.: 26,979

[22] Filed: Mar. 5, 1993

[51] Int. Cl.⁵ .......................... B62B 1/04; F24C 1/16
[52] U.S. Cl. ................................... 280/645; 126/9 R; D7/334
[58] Field of Search ................ 280/645, 641, 652; 126/9 R, 25 R, 30, 304 R; D7/334, 332

[56] References Cited

U.S. PATENT DOCUMENTS

| | | | |
|---|---|---|---|
| 1,214,086 | 1/1917 | Shaw | 126/9 R |
| 2,003,974 | 6/1935 | Pearson | 126/9 R |
| 2,484,239 | 10/1949 | Moon et al. | 280/645 |
| 2,559,710 | 7/1951 | Danielson | 126/9 R |
| 2,624,469 | 1/1953 | Cadwell et al. | 126/9 R |
| 2,994,315 | 8/1961 | Bussing | 126/9 R |
| 3,008,463 | 11/1961 | Frank | 280/645 |
| 3,147,748 | 9/1964 | Frank | 280/641 |
| 3,556,076 | 1/1971 | Stewart | 126/9 R |
| 4,210,118 | 7/1980 | Davis et al. | 126/9 R |
| 5,163,414 | 11/1992 | Haynes, Jr. | 126/9 R |

Primary Examiner—Margaret A. Focarino
Assistant Examiner—Kevin Hurley
Attorney, Agent, or Firm—Kirkpatrick & Lockhart

[57] ABSTRACT

A cart for barbecue grills. The cart has a shelf, a table, two first legs and two second legs. The shelf has two parallel beams for carrying a barbecue grill. The beams each have a first end, a second end and a curved slot formed therein near the second end thereof. A pivot joins together the first ends of the supports. A bar joins together the second ends of the supports. The table has two supports pivotally attached to the beams and a number of slats transversely attached on the supports. The first legs each have a first end, a second end and a linking point sited between the first and second ends thereof. The first ends of the first legs are pivotally attached to the first ends of the supports by the pivot. The second ends of the first legs are joined together by a handle. The second legs each have a first end, a second end and a linking point sited between the first and second ends thereof. The first legs are pivotally linked to the second legs at the linking points thereof. The first ends of the second legs are joined together by a rod receivable in the curved slots so that the cart is in an extended position. The second ends of the second legs carry two wheels for rolling when the cart in a folded position. A hook is attached on the rod for hooking a grip formed on a gas tank. A slat is attached on the first legs and has two cutouts for receiving a cylindrical stand formed below the gas tank.

3 Claims, 5 Drawing Sheets

CART FOR BARBECUE GRILL

BACKGROUND OF INVENTION

1. Field of Invention

The present invention relates to a foldable cart for barbecue grills.

2. Related Prior Art

There have been various trolleys or carts for barbecue grills. The trolleys have wheels for rolling inside patios, but cannot be easily carried outdoors. The carts cannot be folded and, hence, cannot be easily stored. The trolleys or carts are assembled by means of threaded nut-and-bolt sets. Generally, the trolleys or carts are folded before the storage or transportation thereof. To fold the trolleys or carts, some of the threaded nut-and-bolt sets are disengaged by means of tools. The trolleys or carts are extended before the use thereof. In this case, tools are necessary again. It is troublesome to fold and extend the trolleys or carts. It is also inconvenient to carry the necessary tools. Therefore, the present invention is intended to solve the above-mentioned problems.

SUMMARY OF INVENTION

It is an object of the present invention to provide a cart for barbecue grills. The cart has a shelf, a table, two first legs and two second legs. The shelf has two parallel beams for carrying a barbecue grill. The beams each have a first end, a second end and a curved slot formed therein near the second end thereof. A pivot joins together the first ends of the supports. A bar joins together the second ends of the supports. The table has two supports pivotally attached to the beams and a number of slats transversely attached on the supports. The first legs each have a first end, a second end and a linking point sited between the first and second ends thereof. The first ends of the first legs are pivotally attached to the first ends of the supports by the pivot. The second ends of the first legs are joined together by a handle. The second legs each have a first end, a second end and a linking point sited between the first and second ends thereof. The first legs are pivotally linked to the second legs at the linking points thereof. The first ends of the second legs are joined together by a rod receivable in the curved slots so that the cart is in an extended position. The second ends of the second legs carry two wheels for rolling when the cart is in a folded position. A hook is attached on the rod for hooking a grip formed on a gas tank. A slat is attached on the first legs and has two cutouts for receiving a cylindrical stand formed below the gas tank.

For a better understanding of the present invention and objects thereof, a study of the detailed description of the embodiments described hereinafter should be made in relation to the accompanying drawings.

DETAILED DESCRIPTION OF PREFERRED EMBODIMENT

The present invention will be described in detail with reference to the drawings showing some embodiments thereof.

Figure 1:
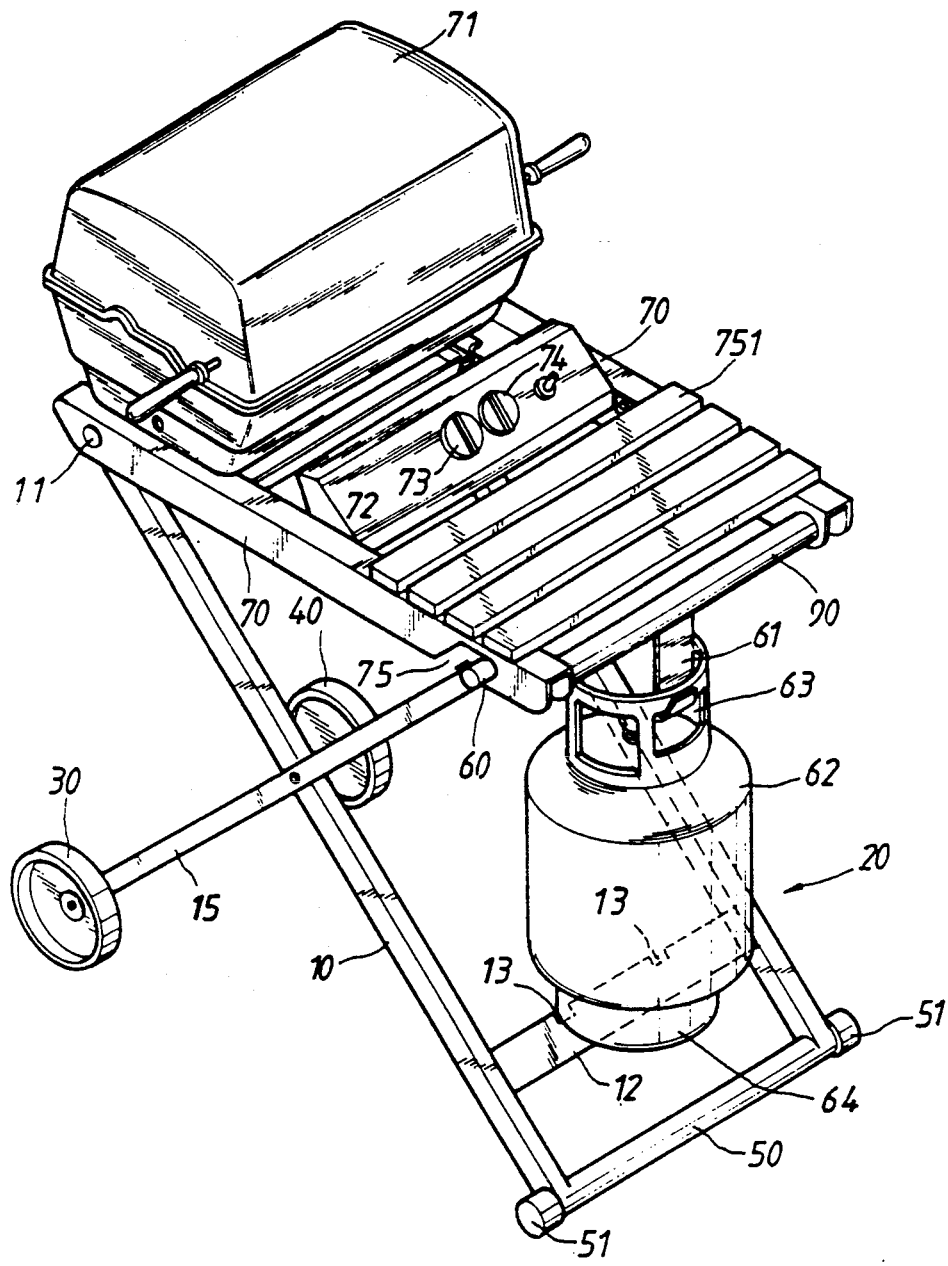
FIG. 1 is a perspective view of a foldable cart for barbecue grills in accordance with the preferred embodiment of the present invention.

Initially referring to FIG. 1, a cart has a shelf consisting of two beams 70 arranged parallel to each other, a pivot 11 linking first ends to each other and a bar 90 linking second ends of the beams 70 to each other.

The pivot 11 also pivotally connects the first ends of the beams 70 with first ends of two legs 10. Second ends of the legs 10 are joined together by means of a handle 50. The handle 50 has two tips fitting in two plastic cup-shaped pads 51.

Middle portions of the legs 10 are pivotally joined together with middle portions of two legs 15. The legs 15 have first ends joined together by means of a rod 60 and second ends joined together by means of a shaft (not shown) carrying two wheels 30.

Figure 2:
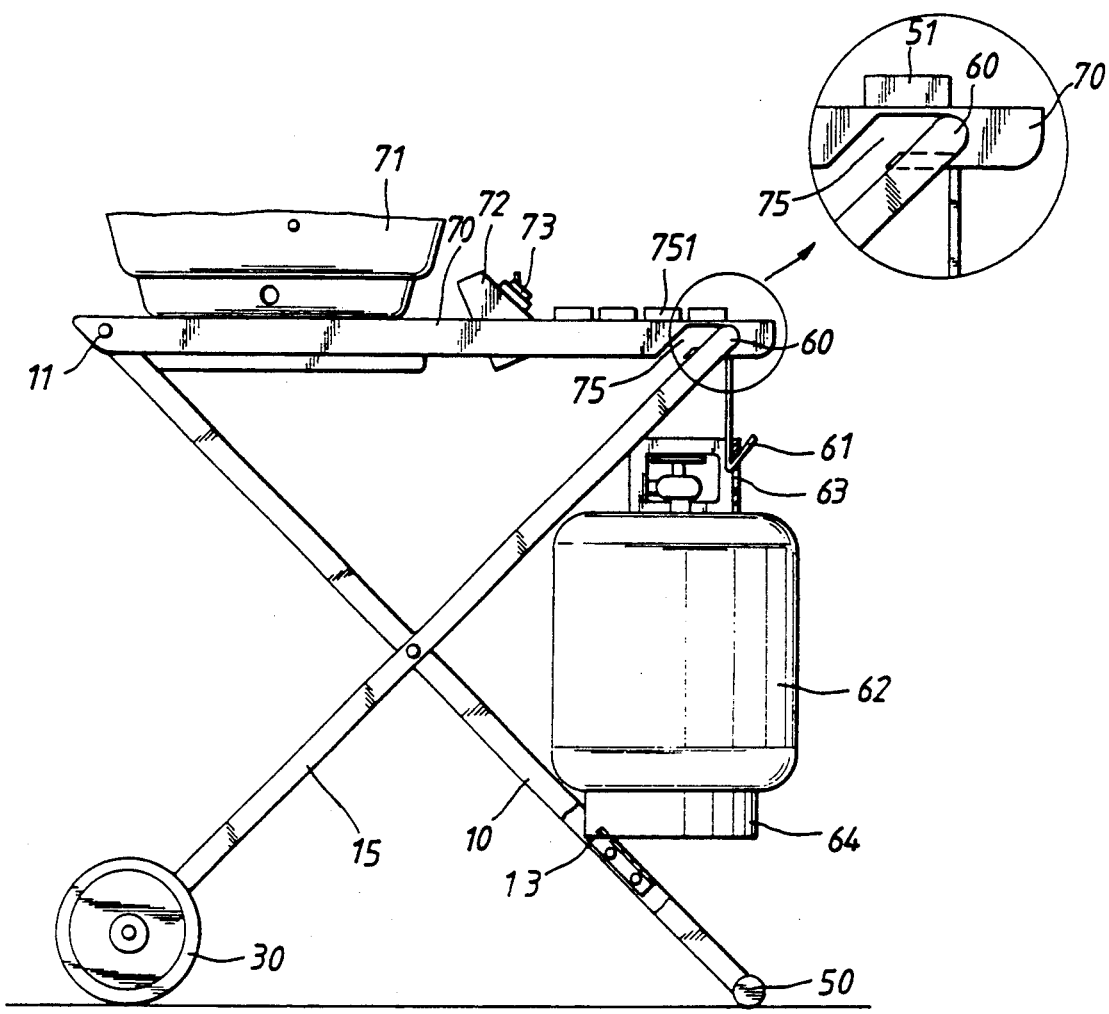
FIG. 2 is a side view of a foldable cart for barbecue grills in accordance with the preferred embodiment of the present invention, carrying a gas tank.

Additionally referring to FIG. 2, a hook 61 is formed on the rod 60 for carrying a gas tank 62 by a grip 63 formed on the gas tank 62. A slat 12 is attached to the legs 10 above the handle 50. The slat 12 has two cutouts 13 formed therein for receiving a cylindrical stand 64 formed below the gas tank 62. Thus, the gas tank 62 is firmly mounted on the cart.

Figure 3:
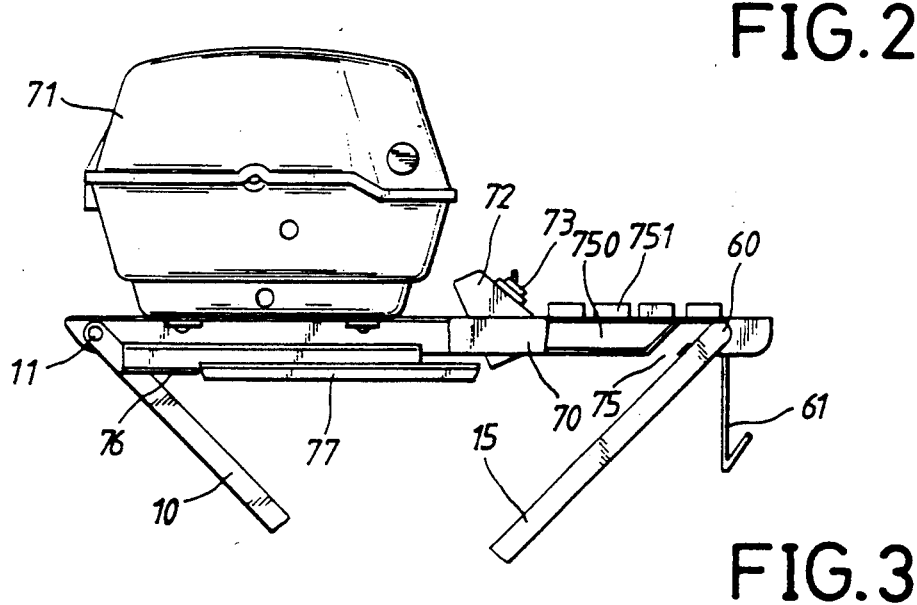
FIG. 3 is an enlarged partial side view of a foldable cart for barbecue grills in accordance with the preferred embodiment of the present invention, without a gas tank.

Referring to FIG. 3, a barbecue grill 71 is mounted on the beams 70 by means of several threaded bolt-and-nut sets. A panel 72 is attached to the beams 70. Two control knobs 73 and 74 are mounted on the panel 72. A pipe (not shown) communicates the gas tank 61 with the barbecue grill 71 by means of the control knob 73 so that the knob 73 is used to control the rate of gas flowing therethrough. The relation between the gas tank 60, the barbecue grill 71 and the control knob 73 is not shown as being well known.

Two flanges 76 are attached on the beams 70 so that they face each other. A tray 77 is mounted on the flanges 76 for receiving ash or the like from the barbecue grill 71.

A table is pivotally mounted on the beams 70. The table consists of two supports 750 pivotally mounted on the beams 70 and a number of slats 751 are transversely attached on the supports 750. The supports 750 can be pivoted so that the slats 751 are sited on the beams 70. Preparation for food can be carried out on the table in such a position.

Further referring to FIG. 2, the beams 70 each have a slot 75 consisting of a first section extending parallel to the legs 15 and a second section extending parallel to the element 70. The rod 60 is passed by the first sections of the slots 75 in order to be received in the second sections of the slots 75. Thus, the legs 10 and 15 are firmly retained in an extended position.

Figure 4:
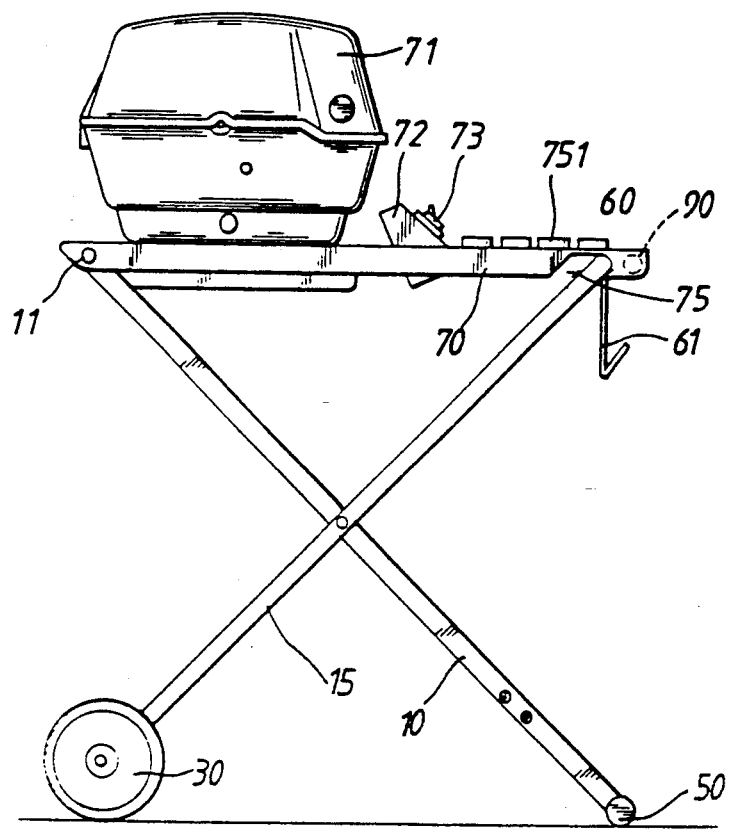
FIG. 4 is a side view of a foldable cart for barbecue grills in accordance with the preferred embodiment of the present invention, without a gas tank.

Referring to FIG. 4, the cart is in an extended position. The gas tank 62 is removed from the hook 61.

Figure 5:
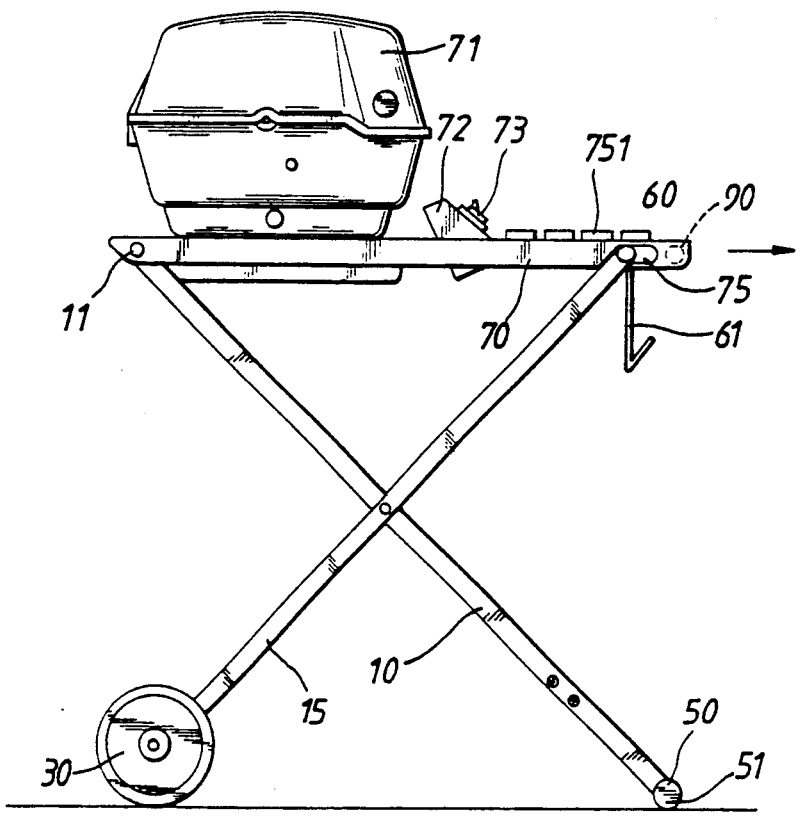
FIG. 5 is a side view of foldable cart for barbecue grills in accordance with the preferred embodiment of the present invention, in a first step of folding.

Referring to FIG. 5, to fold the cart, the handle 50 is retained unmoved and the bar 90 is moved along an arrow as shown therein. The legs 10 are caused to pivot about the handle 50. The rod 60 is moved out of the second sections of the slots 75.

Figure 6:
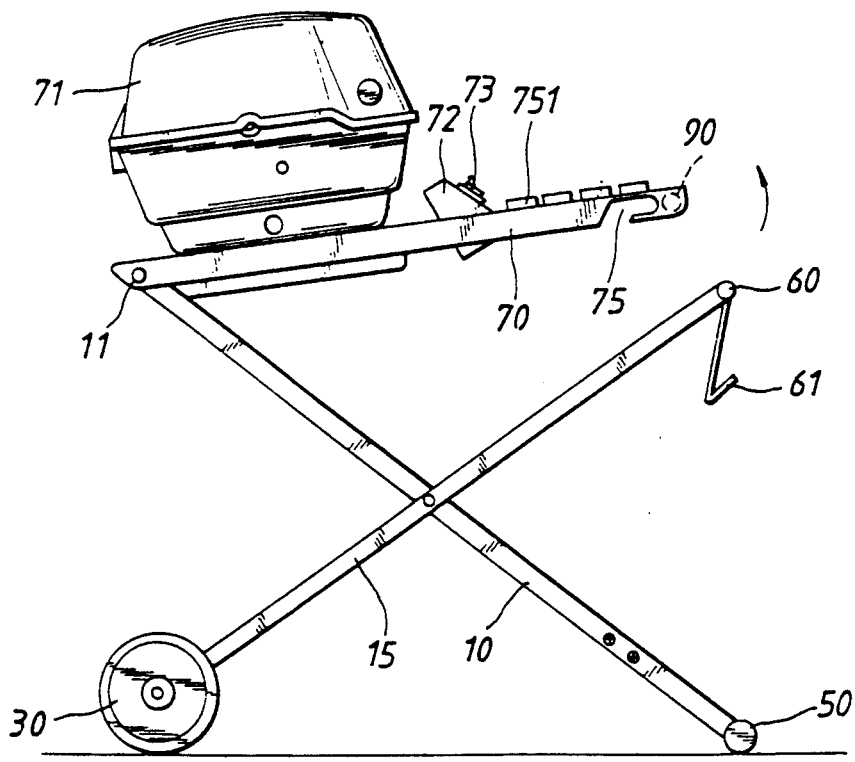
FIG. 6 is a side view of foldable cart for barbecue grills in accordance with the preferred embodiment of the present invention, in a second step of folding.

Referring to FIG. 6, the beams 70 are pivoted along an arrow as shown therein when the rod 60 is moved to the connection of the first sections with the second sections of the slots 75. The rod 60 is then removed from the slots 75.

Figure 7:
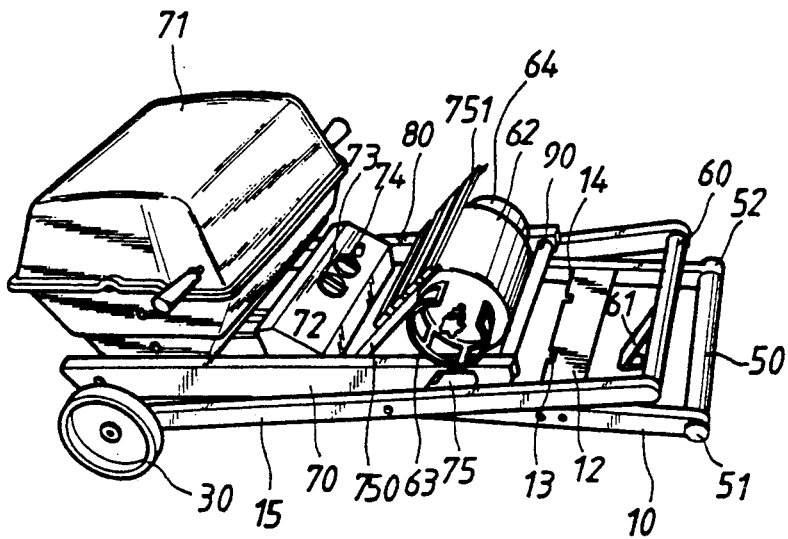
FIG. 7 is a perspective view of a foldable cart for barbecue grills in accordance with the preferred embodiment of the present invention, in a folded position.

Referring to FIG. 7, the cart is folded. The table (consisting of the supports 750 and the slats 751) is pivoted so that the gas tank 62 is mounted therebelow and on the shelf (including the beams 70). The grip 63 is mounted on one of the beams 70 and the cylindrical stand 64 is sited on the remaining of the beams 70.

Figure 8:
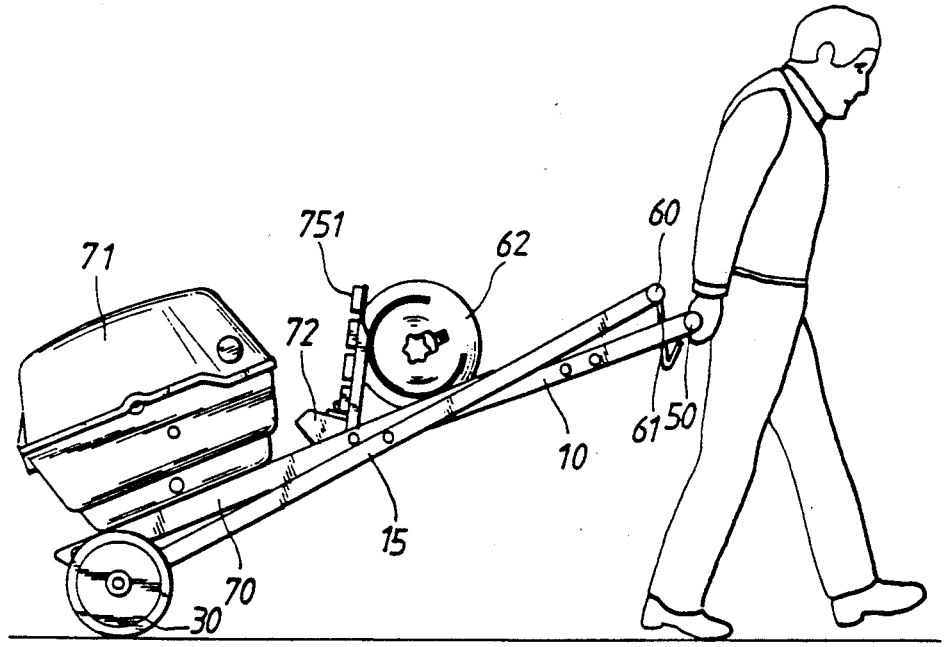
FIG. 8 is a side view of a foldable cart for barbecue grills in accordance with the preferred embodiment of the present invention, manually carried.

Referring to FIG. 8, the cart is manually pulled by the handle 50. The gas tank 62 is firmly retained between the table and the shelf.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A cart for barbecue grills, comprising:
   a shelf comprising:
      two parallel beams for carrying a barbecue grill, the beams each comprising a first end, a second end and a curved slot formed therein near the second end thereof;
      a pivot joining together the first ends of the supports; and
      a bar joining together the second ends of the supports;
   a table comprising:
      two supports pivotally attached to the beams; and
      a number of slats transversely attached on the supports;
   two first legs each comprising a first end, a second end and a linking point sited between the first and second ends thereof, the first ends of the first legs pivotally attached to the first ends of the supports by means of the pivot and the second ends of the first legs joined together by means of a handle;
   two second legs each comprising a first end, a second end and a linking point sited between the first and second ends thereof, the first legs pivotally linked to the second legs at the linking points thereof, the first ends of the second legs joined together by means of a rod receivable in the curved slots so that the cart is in an extended position, the second ends of the second legs carrying two wheels for rolling when the cart in a folded position.

2. A cart in accordance with claim 1, further comprising:
   a hook attached on the rod for hooking a grip formed on a gas tank; and
   a slat being attached on the first legs and defining two cutouts for receiving a cylindrical stand formed below the gas tank.

3. A cart in accordance with claim 1, further comprising a panel attached on the beams for carrying a number of control knobs for controlling the rate of gas flowing through a pipe communicating the gas tank with the barbecue grill by means of the control knobs.

* * * * *